United States Patent
Suh et al.

(10) Patent No.: US 7,961,685 B2
(45) Date of Patent: Jun. 14, 2011

(54) METHOD AND SYSTEM FOR PERFORMING HANDOFF FOR MOBILE STATION IN A MOBILE COMMUNICATION SYSTEM USING PROXY MOBILE IP

(75) Inventors: Kyung-Joo Suh, Seoul (KR); Sung-Ho Choi, Suwon-si (KR); Dae-Gyun Kim, Seongnam-si (KR); Beom-Sik Bae, Suwon-si (KR); Hwan-Joon Kwon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 990 days.

(21) Appl. No.: 11/829,529

(22) Filed: Jul. 27, 2007

(65) Prior Publication Data

US 2008/0043674 A1    Feb. 21, 2008

(30) Foreign Application Priority Data

Jul. 28, 2006 (KR) .................. 10-2006-0071766
Jul. 9, 2007 (KR) .................. 2007-68618

(51) Int. Cl.
    *H04W 4/00*      (2009.01)
    *H04W 24/00*     (2009.01)
    *H04W 36/00*     (2009.01)
(52) U.S. Cl. ............... 370/331; 455/435.1; 455/436
(58) Field of Classification Search .......... None
    See application file for complete search history.

(56) References Cited

U.S. PATENT DOCUMENTS

| 6,230,012 | B1 | 5/2001 | Willkie et al. | |
|---|---|---|---|---|
| 7,496,057 | B2* | 2/2009 | Patel et al. | 370/310 |
| 7,505,432 | B2* | 3/2009 | Leung et al. | 370/331 |
| 2003/0158938 | A1 | 8/2003 | Adatrao et al. | |
| 2005/0287989 | A1* | 12/2005 | Lee | 455/411 |
| 2006/0018280 | A1* | 1/2006 | Kumar et al. | 370/331 |
| 2006/0018291 | A1 | 1/2006 | Patel et al. | |
| 2007/0254661 | A1* | 11/2007 | Chowdhury et al. | 455/436 |

FOREIGN PATENT DOCUMENTS

KR    1020000001177    1/2000

\* cited by examiner

*Primary Examiner* — Pankaj Kumar
*Assistant Examiner* — Marcus R Smith
(74) *Attorney, Agent, or Firm* — The Farrell Law Firm, P.C.

(57) ABSTRACT

A method and system for supporting a handoff of an MS in a PMIP mobile communication system are provided. The method includes a target node transmitting a first registration request message to an HA in order to request registration of the MS, when the MS moves from the service area of a serving node to the service area of the target node; the serving node discarding a second registration request message without processing the second registration request message, when the serving node receives the second registration request message from the MS before the target node receives a first registration response message for the first registration request message from the HA; and the serving node requesting deregistration of the serving node to the HA, when the target node receives the first registration response message from the HA.

32 Claims, 7 Drawing Sheets

US 7,961,685 B2

METHOD AND SYSTEM FOR PERFORMING HANDOFF FOR MOBILE STATION IN A MOBILE COMMUNICATION SYSTEM USING PROXY MOBILE IP

PRIORITY

This application claims priority under 35 U.S.C. §119(a) to Korean Patent Applications filed in the Korean Intellectual Property Office on Jul. 28, 2006 and assigned Serial No. 2006-71766 and on Jul. 9, 2007 and assigned Serial No. 2007-68618, the entire disclosure of which is incorporated herein by reference.

BACKGROUND OF THE INVENTION

1. Field of the Invention

The present invention generally relates to a mobile communication system using Mobile Internet Protocol (IP), and in particular, to a method for performing HandOff (HO) using Proxy Mobile IP (PMIP) to reduce the handoff latency of a Mobile Station (MS) during the HO.

2. Description of the Related Art

The development of mobile communication networks and the growth of Wireless Local Area Network (WLAN)-based services are a driving force behind the increase in number of users that communicate wirelessly using their Mobile Stations (MSs). In this context, more attention is attracted to services through MSs. Mobile IP has been developed to manage the locations of MSs and enable seamless communications for the MSs during HO. There are two Mobile IP versions, Mobile IPv4 (MIPv4) and MIPv6. Mobile IP advantageously allows MSs to transmit and receive data seamlessly, still maintaining the same IP address.

However, Mobile IP itself creates too much overhead to be used in cellular mobile communication networks such as $3^{rd}$ Generation Partnership Project 2 (3GPP2). To reduce the overhead, PMIP has emerged. PMIP reduces HO latency relative to Mobile IP. Yet, MSs have to operate independently of a PMIP network environment irrespective of whether the PMIP network environment supports the conventional IP technology, i.e. Simple IP, MIPv4, or MIPv6.

Efforts are taking place to improve performance by PMIP in mobile communication systems. Especially PMIP is under standardization in the 3GPP2 to improve HO performance. Accordingly, there exists a need for a HO procedure for efficiently supporting MSs using a MIPv4 protocol stack and a method for efficiently managing the structure of HO data in a mobile communication system using MIPv4. There also exists a need for a HO procedure for efficiently supporting MSs using a MIPv6 protocol stack and a method for efficiently managing the structure of HO data in a mobile communication system using MIPv6.

SUMMARY OF THE INVENTION

An aspect of the present invention is to address at least the problems and/or disadvantages and to provide at least the advantages described below. Accordingly, one aspect of the present invention is to provide a method for performing HandOff (HO) for a MIPv4 MS, a method for managing HO data, and a system therefor in a Proxy Mobile IPv4 (PMIPv4) environment.

Another aspect of the present invention is to provide a method for performing HO for a MIPv6 MS, a method for managing HO data, and a system therefor in a PMIPv6 environment.

According to one aspect of the present invention, there is provided a method for supporting a handoff of an Mobile Station (MS) in a Proxy Mobile Internet Protocol (PMIP) mobile communication system. The method includes a target node transmitting a first registration request message to a Home Agent (HA) in order to request registration of the MS, when the MS moves from the service area of a serving node to the service area of the target node; the serving node discarding a second registration request message without processing the second registration request message, when the serving node receives the second registration request message from the MS before the target node receives a first registration response message for the first registration request message from the HA; and requesting deregistration of the serving node to the HA by the serving node, when the target node receives the first registration response message from the HA.

According to another aspect of the present invention, there is provided a method for supporting a handoff of a Mobile Station (MS) in a Proxy Mobile Internet Protocol (PMIP) mobile communication system. The method includes receiving from a target node a first registration request message requesting registration of the (MS), when the MS moves from the service area of a serving node to the service area of the target node; discarding a second registration request message without processing the second registration request message, upon receipt of the second registration request message from a third node before transmitting a first registration response message for the first registration request message to the target node; generating a Binding Cache Entry (BCE) of the MS for managing the MS in response to the first registration request message and transmitting the first registration response message to the target node; and deleting a BCE of the serving node, upon receipt of a deregistration request message from the serving node after transmitting the first registration response message.

According to yet another aspect of the present invention, there is provided a Proxy Mobile Internet Protocol (PMIP) mobile communication system for supporting a handoff of a Mobile Station (MS). The mobile communication system includes a serving node capable of communicating with the MS; a target node capable of communicating with the MS; and an Home Agent (HA) connected to the serving node and the target node, wherein when the MS moves from the service area of the serving node to the service area of the target node, the target node transmits a first registration request message to the HA in order to request registration of the MS, wherein when the serving node receives a second registration request message from the MS before the target node receives a first registration response message for the first registration request message from the HA, the serving node discards the second registration request message without processing the second registration request message, and wherein when the target node receives the first registration response message from the HA, the serving node requests deregistration of the serving node to the HA.

According to still another aspect of the present invention, there is provided a Proxy Mobile Internet Protocol (PMIP) mobile communication system for supporting a handoff of an MS. The mobile communication system includes a serving node capable of communicating with the Mobile Station (MS), a target node capable of communicating with the MS, and an Home Agent (HA) connected to the serving node and the target node, wherein when the MS moves from the service area of a serving node to the service area of the target node, the HA receives a first registration request message requesting registration of the MS from a target node, wherein upon receipt of the second registration request message from a third node before transmitting a first registration response message for the first registration request message to the target node, the HA discards a second registration request message without processing the second registration request message, wherein in response to the first registration request message, the HA generates a Binding Cache Entry (BCE) of the MS for managing the MS and transmits the first registration response message to the target node, and wherein upon receipt of a deregistration request message from the serving node after transmitting the first registration response message, the HA deletes a BCE of the serving node.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF THE PREFERRED EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides an HO procedure in Packet Data Serving Nodes (PDSNs) and a Home Agent (HA) and management of HandOff (HO) data. The PDSNs are network nodes for supporting wireless packet data networking in a Code Division Multiple Access 2000 (CDMA 2000)-based 3GPP2 system. They are responsible for authentication and authorization required for an MS to receive a packet service, routing of packet data, handoff for ensuring mobility, Quality of Service (QoS) management, and accounting. They also allocate IP addresses to MSs or manage the IP addresses.

When a mobile communication network such as a 3GPP2 network adopts Mobile IP, the present invention uses Proxy Mobile IP (PMIP) for MSs in order to decrease HO latency.

While the present invention will be described below in the context of a 3GPP2 system based on synchronous CDMA, it is clear to those skilled in the art that a handoff method according to the present invention is applicable to any mobile communication system with a similar technological background and a similar channel structure with a slight modification made to the present invention within the scope of the present invention.

Figure 1:
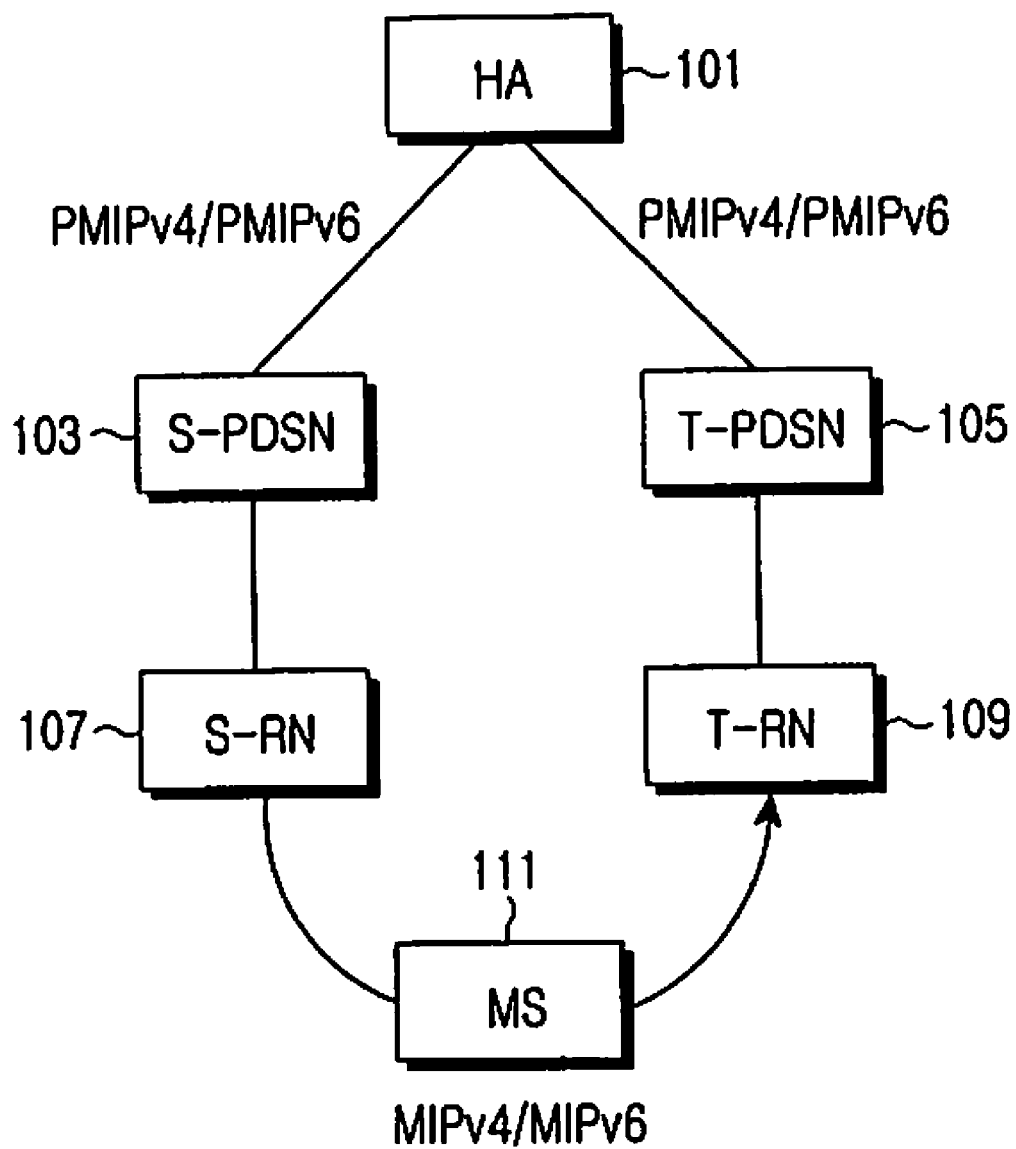
FIG. 1 illustrates the configuration of a mobile communication system using Mobile IP to which the present invention is applied.

FIG. 1 illustrates the configuration of a mobile communication system using Mobile IP to which the present invention is applied. In FIG. 1, an MS 111 moves from a Radio Node (RN) 107 belonging to a PDSN 103 to an RN 109 belonging to a PDSN 105 by handoff. The PDSN 103 and the RN 107 before the handoff are called a Serving PDSN (S-PDSN) and a Serving RN (S-RN), respectively and the PDSN 105 and the RN 109 after the handoff are called a Target PDSN (T-PDSN) and a Target RN (T-RN), respectively. The PDSNs 103 and 105 interwork with an Home Agent (HA) 101 being a network entity that manages mobility. The RNs 107 and 109 establish radio links to the MS 111 within their service areas. Depending on a network type, the RNs 107 and 109 are also called Access Nodes (ANs).

In FIG. 1, the S-PDSN 103 and the T-PDSN 105 communicate with the HA 101 by PMIPv4 or PMIPv6. Under this network environment, the MS 111 conducts communications using Simple IP or Mobile IP. The MS 111 may have a protocol stack independent of PMIP used in the PDSNs 103 and 105. For example, the MS 111 supports MIPv4 or MIPv6 selectively.

The present invention discloses an HO procedure for enabling seamless communications with a minimal latency, when the MS 111 moves from the service area of the S-RN 107 under the S-PDSN 103 to that of the T-RN 109 under the T-PDSN 105 under the above-described network environment.

Embodiment 1

An exemplary embodiment of the present invention provides an HO procedure for efficiently supporting an MS using an MIPv4 protocol stack and an HO data structure in a PMIPv4 mobile communication system.

Figure 2:
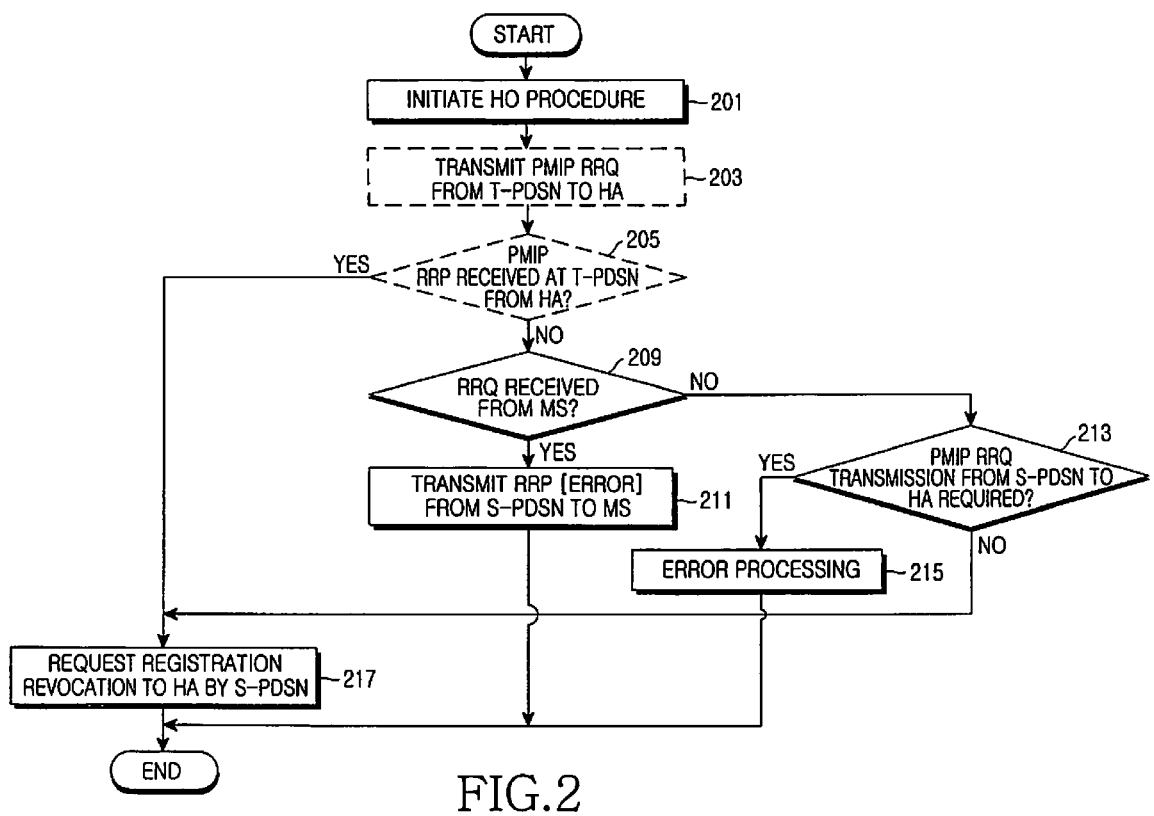
FIG. 2 is a flowchart illustrating operations of Packet Data Serving Nodes (PDSNs) according to the present invention.

FIG. 2 is a flowchart illustrating operations of PDSNs according to the present invention.

In FIG. 2, the S-PDSN and the T-PDSN initiate an HO procedure for the MS in step 201. In the HO procedure, for example, the T-PDSN transmits an HO request to the S-PDSN, requesting HO information of the MS and the S-PDSN replies with an HO response. After the initiation of the HO procedure, the T-PDSN transmits a PMIP Registration Request (RRQ) message to the HA on behalf of the MS in step 203. The PMIP RRQ message reports to the HA that the MS has entered the service area of the T-PDSN so that the HA can manage location information of the MS. The PMIP RRQ message includes a "P" bit indicating that the T-PDSN requests the registration of the MS on behalf of the MS.

In step 205, the S-PDSN monitors whether the T-PDSN has received a PMIP Registration Response (RRP) message from the HA in response to the PMIP RRQ message. For example, the T-PDSN can notify the S-PDSN of the reception of the PMIP RRP message by transmitting an indication message indicating the reception of the PMIP RRP message, or by other signaling. If the T-PDSN has received the PMIP RRP message from the HA, the S-PDSN transmits a registration revocation message to the HA, thus requesting the HA to delete HO data from a binding cache, i.e. a Binding Cache Entry (BCE) that was created as requested by the S-PDSN on behalf of the MS in step 217.

On the other hand, if the T-PDSN has not received the PMIP RRP message from the HA, for example, if the S-PDSN does not confirm that the T-PDSN has received the RRP message, this means that the handoff is not normal. Binding data associated with an address of the MS, which is HO data of the BCE created for managing handoff of the MS, has a predetermined lifetime. When the lifetime expires, the MS transmits an MIP RRQ message to the HA through the S-PDSN to update the address-associated binding data. Therefore, the S-PDSN monitors reception of the MIP RRQ message from the MS in step 209. If the S-PDSN receives the MIP RRQ message from the MS before the PMIP RRP message from the T-PDSN, it transmits an RRP message including an error code to the MS, notifying that the registration request of the MS is wrong in step 211.

If the handoff from the S-PDSN to the T-PDSN is not normally completed, the S-PDSN transmits a wrong PMIP RRQ message, for example, to the HA on behalf of the MS. Thus, the S-PDSN determines whether an event triggering transmission of a PMIP RRQ message to the HA has occurred in step 213. Upon generation of the event, the S-PDSN performs error processing without transmitting the PMIP RRQ message in step 215. On the contrary, if the S-PDSN has not transmitted the RRQ message to the HA, this implies that the MS has succeeded in the handoff from the S-PDSN to the T-PDSN. Thus, the S-PDSN goes to step 217 in order to request the HA to revoke the registration of the MS.

Figure 3:
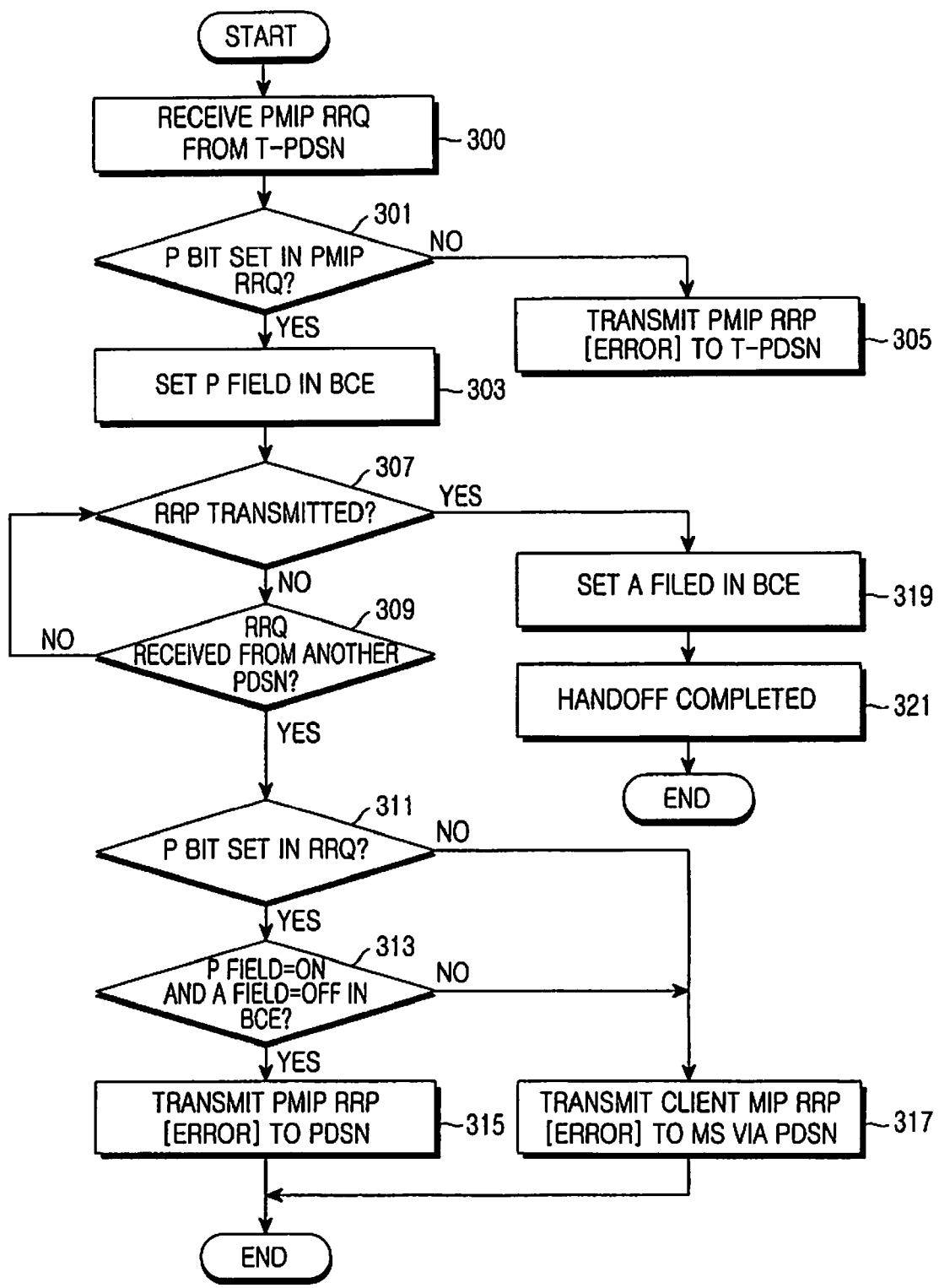
FIG. 3 is a flowchart illustrating an operation of a Home Agent (HA) according to an exemplary embodiment of the present invention.

FIG. 3 is a flowchart illustrating an operation of the HA according to the present invention.

In FIG. 3, the HA receives a first PMIP RRQ message that the T-PDSN has transmitted on behalf of the MS in step 300 and determines whether a P bit is set in the first PMIP RRQ message in step 301.

If the P bit is set, the HA searches for a T-PDSN-associated BCE managed under the ID of the MS in the binding cache for managing the location information of registered MSs and sets a P field to 'on' in the BCE in step 307. If the BCE does not exist, the HA creates a T-PDSN-associated BCE for the MS and sets the P field to 'on' in the BCE in step 303. The setting of the P field means that the MS communications by PMIPv4. The ID of the MS can be a Home of Address (HoA) or a Network Access Identifier (NAI).

If the P bit is not set in the first PMIP RRQ message, the HA transmits a first PMIP RRP message with an error code to the T-PDSN, notifying that the location of the MS has not been registered normally in step 305. Then the T-PDSN may retransmit the PMIP RRQ message to the HA.

In step 307, the HA determines whether the first PMIP RRP message has been transmitted for the first PMIP RRQ message. If the first PMIP RRP message has been transmitted to the T-PDSN, the HA sets an A field of the BCE to 'on', indicating the transmission of the first PMIP RRP message in step 319 and completes the handoff of the MS in step 321.

Furthermore, if the HA receives a second PMIP RRQ message for the MS from the S-PDSN or a third PDSN before transmitting the first PMIP RRP message for the first PMIP RRQ message in step 309, the HA determines whether a P bit is set in the second PMIP RRQ message in step 311. The second PMIP RRQ message is from the S-PDSN or the third PDSN, or it is a usual MIP message received from the MS through the S-PDSN. If the P bit is set in the second PMIP RRQ message, the HA determines whether a P field is 'on' and an A field is 'off' in a BCE to which the second PMIP RRQ message is to be registered in step 313.

If the P field is 'on' and the A field is 'off', the HA transmits a second PMIP RRP message with an error code to the PDSN that transmitted the second PMIP RRQ message, notifying the PDSN that the requested registration has not been performed in step 315. As the HA does not amend the BCE of the MS with the second PMIP RRQ messages, it prevents redundant new registration for the MS as requested by some other PDSN in the situation where the registration requested by the T-PDSN in the first PMIP RRQ message is not yet completed.

If the P bit is not set in the second PMIP RRQ message or the P field of the BCE associated with the second PMIP RRQ message is 'off' in step 313, which implies that the registration of the MS by MIP, specifically client MIP has been requested in the course of the PMIP procedure, the HA transmits a second client-MIP RRP message with an error code to the third PDSN which is to deliver the second client-MIP RRP message to the MS in step 317. Similarly, the HA does not amend the BCD of the MS with the second PMIP RRQ message, and the MS is aware that the registration requested by the second RRQ message is not done successfully due to the second RRP message.

Table 1 below illustrates a BCE managed by the HA according to an exemplary embodiment of the present invention.

TABLE 1

| Max Sequence | HoAv4 | NAI | CoAv4 | P | A |
| --- | --- | --- | --- | --- | --- |

The BCE of Table 1 is managed using an ID of the MS, for example, a NAI as a key. The HA searches the binding cache with a NAI included in a received message. In the absence of a desired BCE corresponding to the NAI, the HA creates a new BCE. In the presence of the desired BCE, the HA updates the BCE. It can be further contemplated as another embodiment that an HoA is used as the ID of the MS by which the BCE is managed.

In Table 1, Max Sequence is used to manage the sequence of Binding Updates (BUs). HoAv4 is the HoA of the MS in an IPv4 format. NAI is a network access identifier and CoAv4 is an IPv4 Care of Address (CoA) used for the S-PDSN to manage handoff of the MS. P is a field indicating whether a Proxy registration request has been made. A is a field indicating whether a proxy registration response, i.e. a binding acknowledgement has been transmitted.

Figure 4:
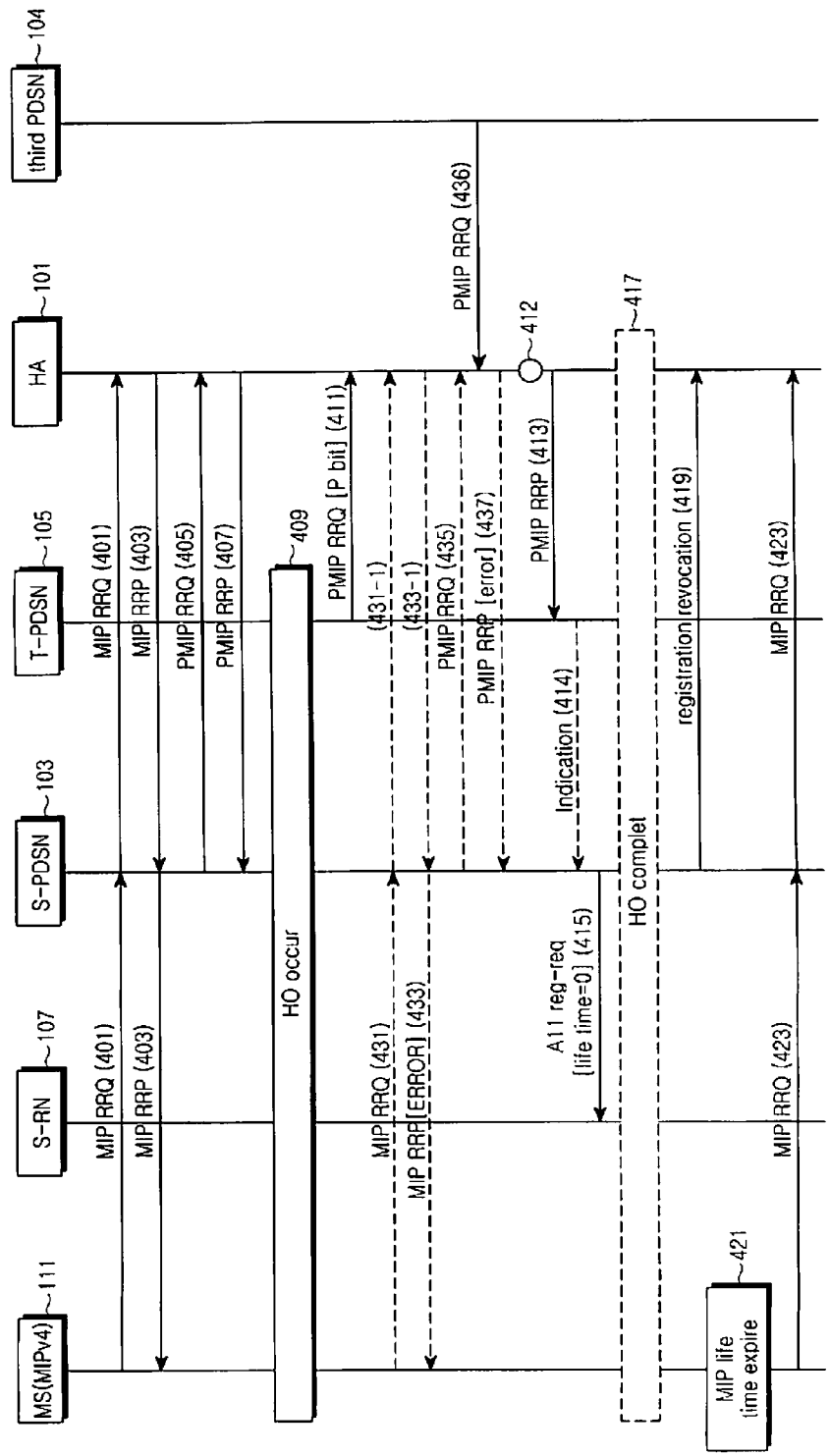
FIG. 4 is a diagram illustrating a signal flow for performing a HandOff (HO) procedure for an MS according to the present invention.

FIG. 4 is a diagram illustrating a signal flow for performing an HO procedure for an MS in a PMIPv4 network environment according to the present invention.

In FIG. 4, upon generation of an event triggering registration in the MS 111, the MS 111 transmits an MIP RRQ (i.e. MIPv4 RRQ) message to the HA 101 through the S-PDSN 103 in step 401. The HA 101 replies to the MS 111 through the S-PDSN 103 by an MIP RRP message in step 403. Upon generation of an event triggering registration of the MS 111 in the S-PDSN 103, the S-PDSN 103 transmits a PMIP RRQ (i.e. PMIPv4 RRQ) message to the HA 101 on behalf of the MS 111 in step 405 and the HA replies to the S-PDSN 103 with an PMIP RRP message for the PMIP RRQ message in step 407.

As the MS 111 moves from the service area of the S-RN 107 under the S-PDSN 103 to that of the T-PDSN 105, a handoff is triggered among the MS 111, the S-RN 107, the S-PDSN 103, the T-RN (not shown), and the T-PDSN 105 in step 409. During the handoff, a context containing communication information about the MS 111 is transferred from the S-PDSN 103 to the T-PDSN 105. After receiving the context, the T-PDSN 105 transmits a PMIP RRQ message to the HA 101 on behalf of the MS 111 in step 411. The HA 101 updates the BCE of the MS 111 in response to the PMIP RRQ message in step 412 and transmits a PMIP RRP message to the T-PDSN 105 in step 413. The HA 101 sets the P field to 'on' in the BCE of the MS in accordance with a P bit set in the PMIP RRQ message and sets the A field to 'on' in the BCE of the MS after transmitting the PMIP RRP message to the T-PDSN 105.

If the S-PDSN 103 receives an MIP RRQ (i.e. MIPv4 RRQ) message from the MS 111 as the lifetime of the BCE of the MS expires before the HA 101 transmits the PMIP RRP message to the T-PDSN in step 431, it transmits an MIP RRP message with an error code to the MS 111 in step 433. For example, the S-PDSN 103 determines that the T-PDSN 105 has not received the PMIP RRP message from the HA 101 until receiving an indication message in step 414. Consequently, this prevents the HA 101 from redundantly performing the registration of the MS 111 requested by the MIP RRQ message in step 431 before completing the registration of the MS 111 requested by the PMIP RRQ message in step 411.

In another exemplary embodiment of the present invention, when the S-PDSN 103 receives the MIP RRQ message from the MS before the indication message, it simply neglects the MIP RRQ message without transmitting a response message with an error code. A third exemplary embodiment of the present invention can be contemplated in which the S-PDSN 103 relays the MIP RRQ message to the HA 101 in step 431-1 and the HA 101 neglects the MIP RRQ message. In accordance with a fourth exemplary embodiment of the present invention, the HA 101 transmits an MIP RRP message with an error code to the MS 111 through the S-PDSN 103 for the MIP RRQ message in steps 433-1 and 433.

In the case where the HA 101 receives a PMIP RRQ (i.e. PMIPv4 RRQ) message from the S-PDSN 103 before transmitting the PMIP RRP message to the T-PDSN 105 in step 435, the HA 101 confirms that the registration of the MS is not completed, referring to the P and A fields of the BCE of the MS 111 and transmits a PMIP RRP message with an error code to the S-PDSN 103 in step 437. This prevents the HA 101 from redundantly register the location of the MS 111 requested by the PMIP REQ message in step 435 before the registration requested by the PMIP REQ message in step 411 is completed. In another embodiment of the present invention, if the HA 101 receives a PMIP RRQ message from a third PDSN before transmitting the PMIP RRP message to the T-PDSN 105, the HA 101 simply neglects the PMIP RRQ message without transmitting a response message with an error code.

For instance, after recognizing that the T-PDSN 105 has received the PMIP RRP message from the HA 101 in step 413 by receiving the indication message from the T-PDSN 105 in step 414, the S-PDSN 103 transmits an A11 registration request (A11 reg-req) message with a lifetime for registration set to 0 to the S-RN 107 in step 415. Upon expiration of the lifetime, the S-RN 107 deletes communication information about the MS 111 and releases a radio link from the MS 111. In step 417, the MS 111 completes the handoff involving the S-RN 107, the T-RN 109, the S-PDSN 103, the T-PDSN 105, and the HA 101. The S-PDSN 103 then transmits a registration revocation message to the HA 101 in step 419. The HA 101 deletes the BCE of the MS 111 associated with the S-PDSN 103 in response to the registration revocation message, so that a tunnel to the MS 111 switches from the S-PDSN 103 to the T-PDSN 105. Upon generation of an event triggering registration of the MS 111 in the MS 111 due to expiration of an MIPv4 lifetime in step 421, the MS 111 transmits an MIP RRQ (i.e. MIPv4 RRQ) message to the HA 101 through the S-PDSN 103 in step 423. Thus, the HA 101 updates the location of the MS 111 as requested by the MS 111.

Embodiment 2

In another embodiment of the present invention, there is provided an HO procedure for efficiently supporting an MS using a MIPv6 protocol stack and an HO data structure in a PMIPv6 mobile communication system.

Figure 5:
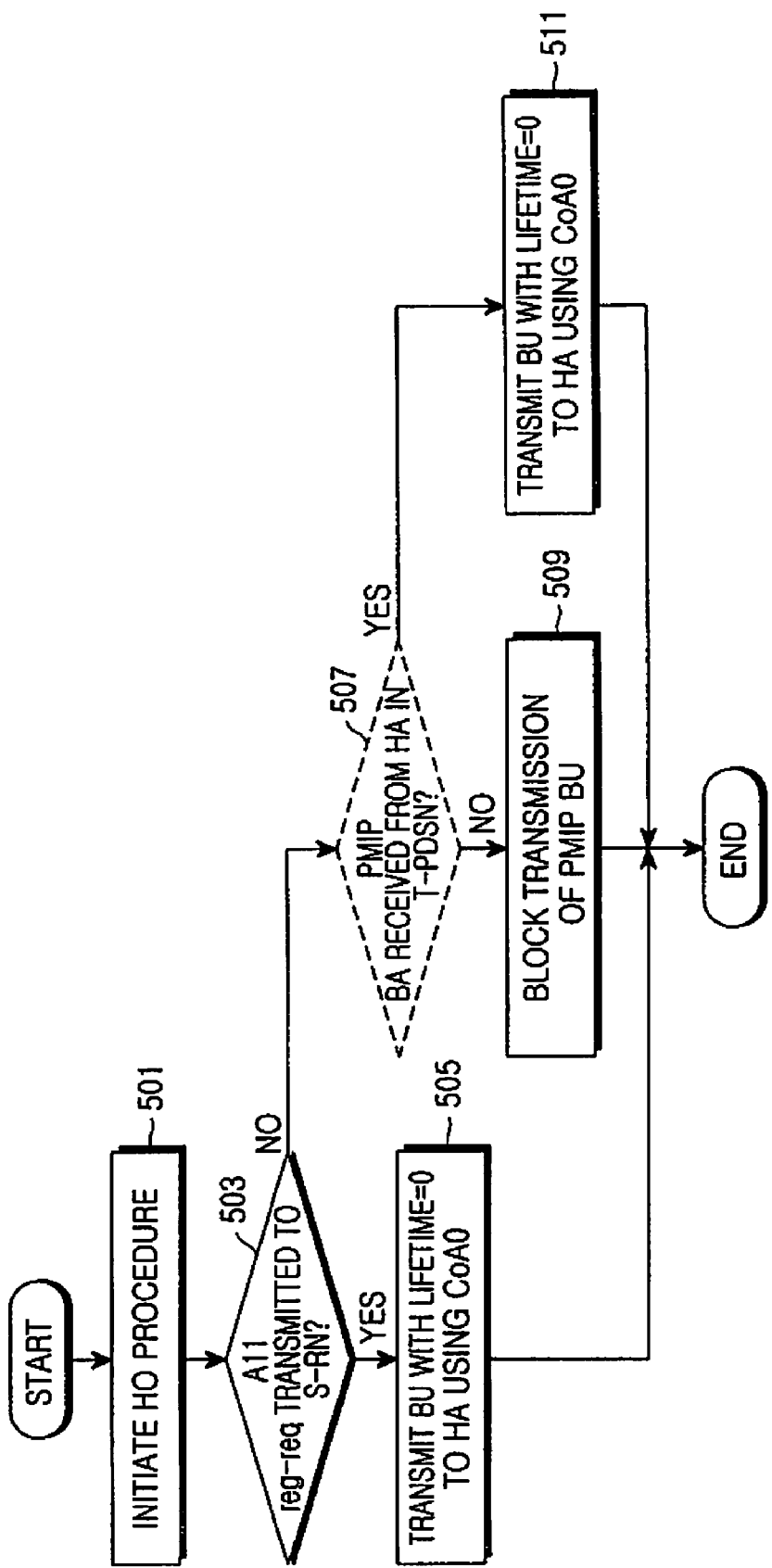
FIG. 5 is a flowchart illustrating operations of PDSNs according to the present invention.

FIG. 5 is a flowchart illustrating operations of PDSNs according to another embodiment of the present invention.

In FIG. 5, the S-PDSN and the T-PDSN initiate a handoff procedure for the MS in step 501. In step 503, the S-PDSN determines whether an A11 reg-req message has been transmitted to the S-RN with a lifetime set to 0. The reason for setting the lifetime of the A11 reg-req message is to command radio link disconnection between the MS and the S-RN. If the A11 reg-req message has been transmitted to the S-RN, a Binding Update (BU) message that the S-PDSN will transmit to the HA on behalf of the MS needs to be controlled.

Therefore, the S-PDSN transmits a BU message to the HA using a first CoA, CoA0 used for a BCE that the S-PDSN registered to the HA in step 505. To request deletion of a BCE associated with the S-PDSN in the HA, the BU message includes a lifetime set to 0.

If the S-PDSN has not yet transmitted to the S-RN the A11 reg-req message with the lifetime set to 0, the S-PDSN determines whether T-PDSN has received a Binding Acknowledge (BA) message from the HA in step 507. The BA message transmission/reception is part of the handoff procedure in response to a PMIP BU message which the T-PDSN has been transmitted to the HA on behalf of the MS. The PMIP BU message contains a P field indicating that the T-PDSN requests registration of the MS on behalf of the MS. If the T-PDSN has not received the BA message from the HA, which implies that the registration of the MS requested by the T-PDSN is not completed, the S-PDSN blocks transmission of a PMIP BU message to the HA even though an event triggering BU message transmission occurs in step 509. The S-PDSN can determine whether or not the T-PDSN has received the BA message by receiving an indication message indicating the reception or non-reception of the BA message from the T-PDSN.

Meanwhile, if the T-PDSN has received the BA message in step 507, the S-PDSN transmits a BU message using the first CoA, CoA0 to the HA when an event triggering BU message transmission occurs in step 511. To request deletion of the BCE of the S-PDSN from the HA, a lifetime is set to 0 in the BU message.

Figure 6:
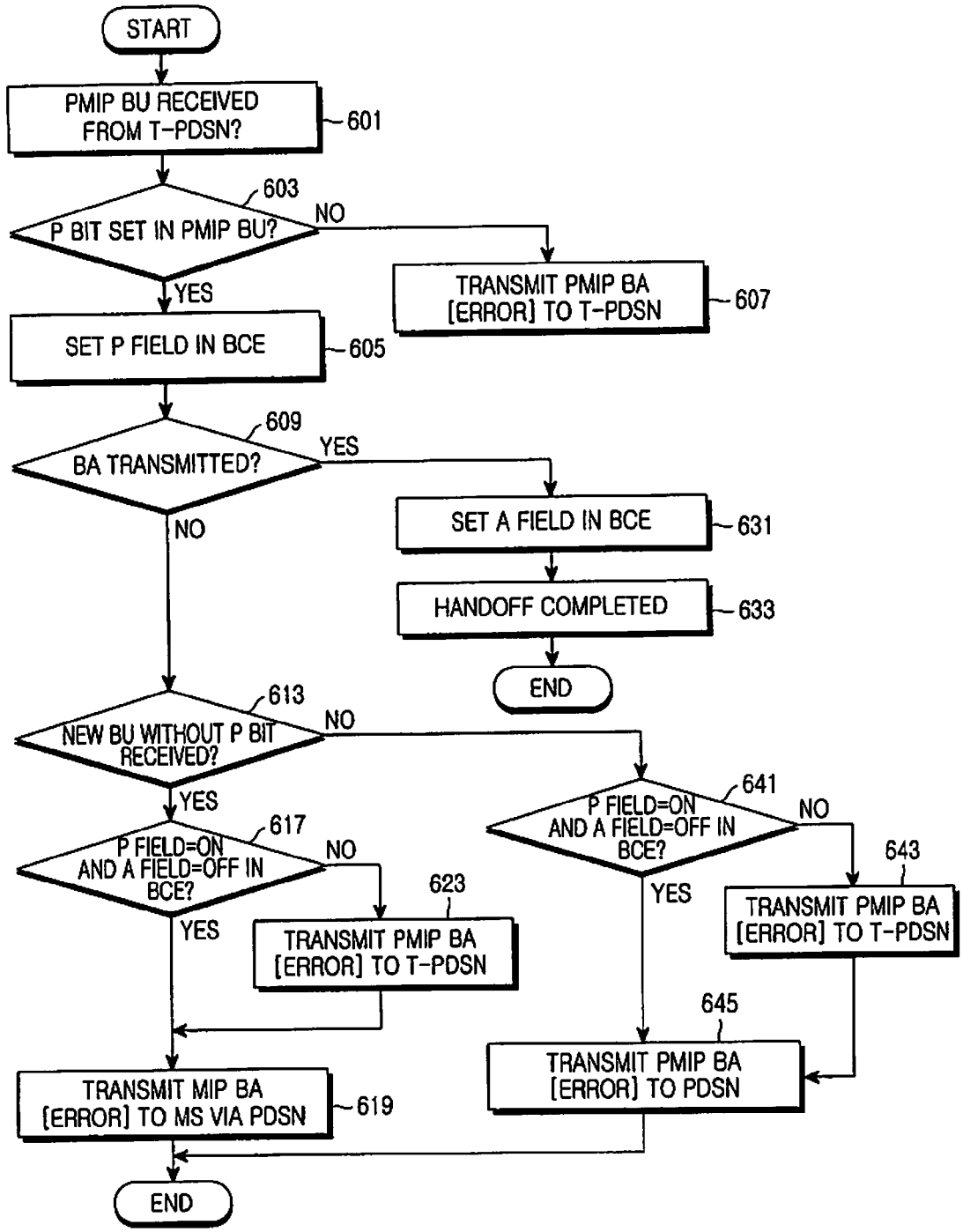
FIG. 6 is a flowchart illustrating an operation of an HA according to the present invention.

FIG. 6 is a flowchart illustrating an operation of an HA according to another embodiment of the present invention.

In FIG. 6, the HA receives a first PMIP BU message from the T_PDSN on behalf of the MS in step 601 and determines whether a P bit is set in the first PMIP BU message in step 603. The P bit is used to indicate that the T-PDSN requests registration of the MS on behalf of the MS by PMIP. If the P bit is set, the HA detects a T-PDSN-associated BCE managed under an ID of the MS and sets a P field to 'on' in the BCE in step 605 and then proceeds to step 609. If the P bit is not set in the first PMIP BU message, the HA transmits a BA message with an error code to the T-PDSN, notifying that the registration of the MS is failed in step 607. Then the T-PDSN can retransmit a PMIP BU message for registration to the HA.

In step 609, the HA determines whether a first PMIP BA message has been transmitted for the first PMIP BU message. If first PMIP BA has been transmitted, the HA then sets an A field to 'on' in the BCE to indicate the transmission of the first PMIP BA message in step 631 and ends the handoff in step 633.

If the HA receives a second BU message without a P bit from the S-PDSN or a third PDSN before transmitting the first PMIP BA message in step 613, it detects a BCE for the MS, considering that the second BU message is from the MS, and checks whether a P field is 'on' and an A field is 'off' in the BCE in step 617.

If the P field is 'on' and the A field is 'off' in the BCE, the HA transmits an MIP BA message with an error code to the MS through the S-PDSN or the third PDSN, notifying that errors have occurred to MIPv6 registration in step 619. Otherwise, the HA transmits a PMIP BA message with an error code to the T-PDSN, notifying that the PMIP registration requested by the T-PDSN is failed in step 623 and goes to step 619. Upon the notification of the PMIP registration failure, the T-PDSN may try re-registration.

Furthermore, upon receipt of a second BU message with a P bit in step 613, the HA determines that the second BU message is from another PDSN (e.g. the S-PDSN or a third PDSN) and goes to step 641. In step 641, the HA checks whether the P field is 'on' and the A field is 'off' in the BCE of the MS. If the P field is 'on' and the A field is 'off', the HA transmits a second PMIP BA message with an error code to the S-PDSN or the third PDSN, notifying that the registration requested by the second BU message has not been processed in step 645.

In any other case than the P field='on' and the A field='off', the HA transmits a first PMIP BA message with an error code to the T-PDSN to notify that errors have occurred to the registration requested by the first BU message in step 643. Upon the notification of the PMIP registration failure by the first BA message, the T-PDSN may try re-registration. In view of the PMIP registration failure, the HA does not set the A field to 'on' in the BCE in step 643. After transmitting the first BA message, the HA notifies the PDSN that transmitted the second PMIP BU message with the P field of the failure of the registration requested by the second PMIP BU message in step 645.

TABLE 2

| Max Sequence | HoAv6 | NAI | CoAv6 | P | A |
| --- | --- | --- | --- | --- | --- |

The BCE of Table 2 above is managed using a NAI or an HoA as a key. Max Sequence is used to manage the sequence of BU messages. HoAv6 is the HoA of the MS in an IPv6 format. NAI is a network access identifier and CoAv6 is a CoA taking an IPv6 format, for use in the S-PDSN's managing handoff of the MS. P is a field indicating whether the T-PDSN has requested registration of the MS on behalf of the MS by a PMIP BU message. A is a field indicating whether a PMIP BA message has been transmitted for the PMIP BU message.

Figure 7:
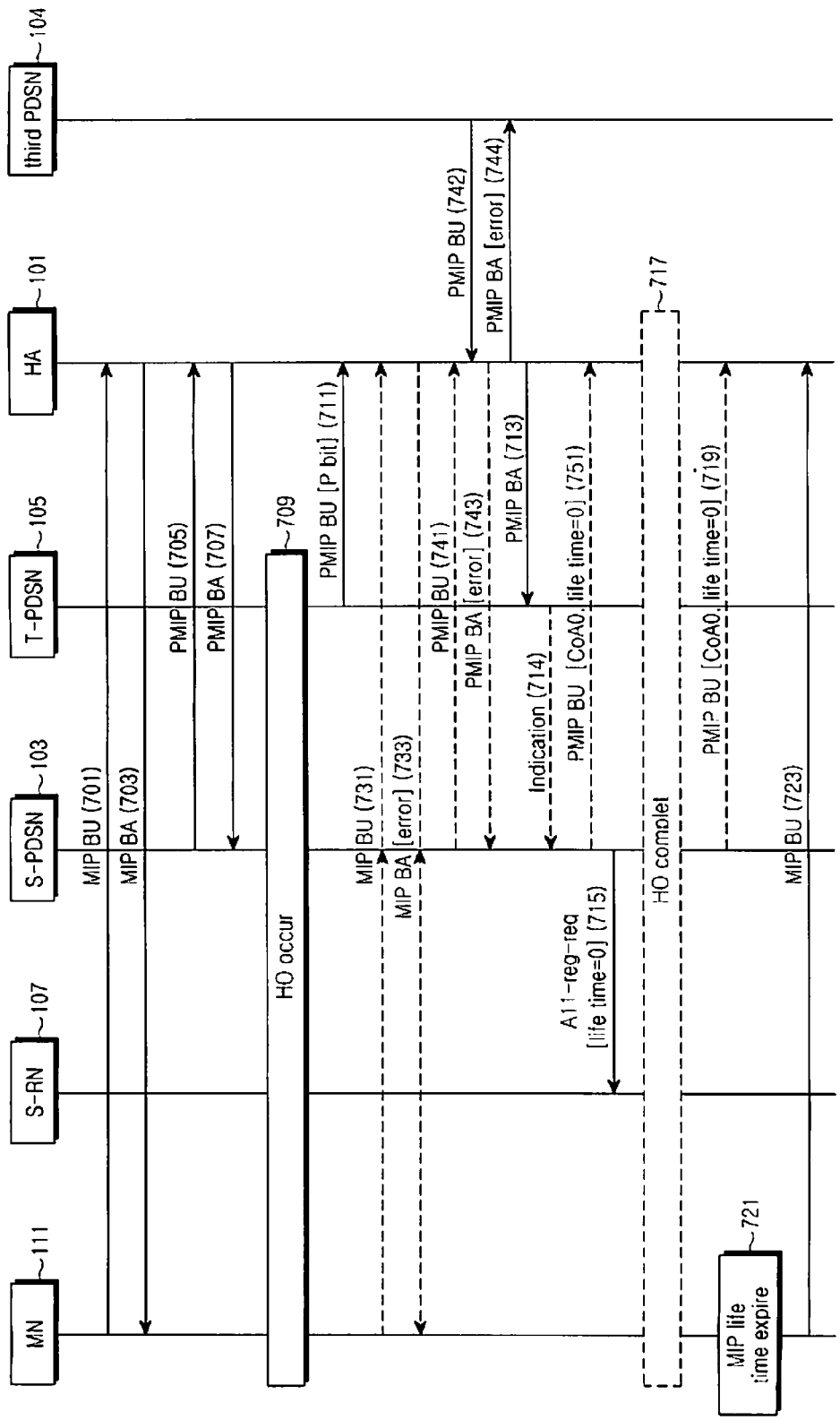
FIG. 7 is a diagram illustrating a signal flow for performing a HandOff (HO) procedure for an MS according to the present invention.

FIG. 7 is a diagram illustrating a signal flow for performing an HO procedure for an MS according to the present invention.

In FIG. 7, when an event triggering registration occurs in the MS 111, the MS 111 transmits an MIP BU (i.e. MIPv6 BU) message to the HA 101 via the S-PDSN 103 in step 701. As the HA 101 replies with an MIP BA message in step 703, the MS is now able to conduct data communications in MIPv6. When an event triggering registration of the MS 111 occurs to the S-PDSN 103, the S-PDSN 103 transmits a PMIP BU (i.e. PMIPv6 BU) message to the HA 101 in step 705 and receives a PMIP BA (i.e. PMIPv6 BA) message from the HA in step 707. Thus, the S-PDSN 103 is capable of data communications in PMIPv6.

As the MS 111 moves from the service area of the S-RN 107 covered under the S-PDSN 103 to that of the T-PDSN 105, a handoff is triggered among the MS 111, the S-RN 107, the S-PDSN 103, the T-RN (not shown), and the T-PDSN 105 in step 709. For example, if a context containing communication information about the MS 111 is transferred from the S-PDSN 103 to the T-PDSN 105 during the handoff, the T-PDSN 105 transmits a PMIP BU message to the HA 101 on behalf of the MS 111 using the received context in step 711. In step 713, the HA 101 updates a BCE of the MS 111 in response to the PMIP BU message and transmits a PMIP BA message to the T-PDSN 105. In this manner, the PMIP registration is performed in the HO procedure for the MS 111. Also, the HA 101 sets a P field to 'on' in the BCE of the MS 111 in accordance with a P bit set in the PMIP BU message and sets an A field to 'on' in the BCE after transmitting the PMIP BA message to the T-PDSN 105. After step 713, the T-PDSN 105 may notify the S-PDSN 103 of the handoff of the MS 111 to the T-PDSN 105 and the registration of the MS 111 by an indication message in step 714.

If in step 731, the HA 101 receives an MIP BU message from the MS 111, for example, due to time expiration of the lifetime of address-associated binding data in the MS 111 before transmitting the PMIP BA message to the T-PDSN 105, it simply neglects the MIP BU message or transmits an MIP BA message with an error code to the MS 111 in step 733. That is, the HA 101 does not perform the re-registration of the MS 111 as requested by the MIP BU message.

If an event triggering transmission of a PMIP BU message to the HA 101 occurs in the S-PDSN 103 before the HA 101 transmits the PMIP BA message to the T-PDSN 105, the S-PDSN 103 can block transmission of the PMIP BU message. In another exemplary embodiment of the present invention, if the HA 101 receives a PMIP BU message from the S-PDSN 103 in step 741, it determines that the registration of the MS 111 is not completed, referring to the P field and A field of the BCE of the MS 111 and thus simply neglects the PMIP BU message, or transmits a PMIP BA message with an error code to the S-PDSN 103, neglecting the PMIP BU message in step 743. That is, the HA 101 does not perform the registration of the MS 111 requested by the PMIP BU message. Upon receipt of a PMIP BU message with a lifetime set to 0 to request deletion of an S-PDSN-associated BCE from the S-PDSN 103 in step 751 after transmitting the PMIP BA message to the T-PDSN 105 in step 713, the HA 101 deletes the S-PDSN-associated BCE. After step 751 or step 714, the S-PDSN 103 transmits an A11 reg-req message with a lifetime set to 0 to the S-RN 107, thus commanding release of a radio link from the MS 111 in step 715.

When the registration of the MS 111 is completed in the HA 101 in step 751, deletion of the S-PDSN-associated BCE from the HA 101 takes place after step 717. That is, the MS 111 completes the HO procedure involving the S-RN 107, the T-RN 109, the S-PDSN 103, the T-PDSN 105, and the HA 101 in step 717. In step 719, the S-PDSN 103 transmits a PMIP BU message with a lifetime set to 0 to request deletion of the S-PDSN-associated BCE to the HA 101. As the HA 101 deletes the S-PDSN-associated BCE for the MS 111, a data tunnel for the MS 111 is switched from the S-PDSN 103 to the T-PDSN 105. Meanwhile, if an event triggering registration occurs to the MS 111 due to expiration of the lifetime of an MIPv6 BCE in step 721, the MS 111 transmits an MIP BU message to the HA 101 in step 723 and the HA 101 registers the location of the MS 111.

As described above, the present invention defines a method for managing a BCE and an HO procedure in order to overcome HO problems that a MIPv4 MS or an MIPv6 MS may encounter in a PMIPv4 or PMIPv6 network environment, and to enable a more efficient HO. Therefore, HO latency is reduced and efficient communications are supported by PMIP/MIP in a mobile communication environment.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for supporting a handoff of a Mobile Station (MS) in a Proxy Mobile Internet Protocol (PMIP) mobile communication system, comprising:
transmitting a first registration request message to a Home Agent (HA) by a target node in order to request registration of the MS, when the MS moves from a service area of a serving node to a service area of the target node;
discarding a second registration request message without processing the second registration request message by the serving node, when the serving node receives the second registration request message from the MS before the target node receives a first registration response message for the first registration request message from the HA; and
requesting deregistration of the serving node to the HA by the serving node, when the target node receives the first registration response message from the HA.

2. The method of claim 1, wherein the first registration request message includes a P bit set to indicate that the target node requests the registration of the MS by PMIP.

3. The method of claim 1, further comprising blocking transmission of a registration request message for the MS to the HA and performing an error process by the serving node, when an event triggering transmission of the registration request message for the MS to the HA occurs in the serving node before the target node receives the first registration response message from the HA.

4. The method of claim 1, further comprising transmitting a second registration response message with an error code to the MS by Mobile Internet Protocol (MIP) in response to the second registration request message by the serving node.

5. The method of claim 4, wherein the registration request messages are at least one of PMIP version 4 (PMIPv4) Registration Request (RRQ) messages, MIP version 4 (MIPv4) RRQ messages, PMIP version 6 (PMIPv6) Binding Update (BU) messages, and MIPv6 BU messages, and the registration response messages are at least one of PMIPv4 Registration Response (RRP) messages, MIPv4 RRP messages, PMIPv6 Binding Acknowledge (BA) messages, and MIPv6 BA messages.

6. The method of claim 1, further comprising transmitting to the serving node an indication message indicating reception of the first registration response message from the HA by the target node.

7. The method of claim 1, further comprising transmitting a third registration request message with a lifetime set to 0 to request deletion of communication information about the MS to a serving Radio Node (RN) connected to the MS via a radio link in the service area of the serving node by the serving node, when the target node receives the first registration response message from the HA.

8. The method of claim 1, wherein the serving node and the target node are Packet Data Serving Nodes (PDSNs).

9. A method for supporting a handoff of a Mobile Station (MS) in a Proxy Mobile Internet Protocol (PMIP) mobile communication system, comprising:
receiving a first registration request message requesting registration of the MS from a target node, when the MS moves from a service area of a serving node to a service area of the target node;
discarding a second registration request message without processing the second registration request message, upon receipt of the second registration request message from a third node before transmitting a first registration response message for the first registration request message to the target node;
generating a Binding Cache Entry (BCE) of the MS for managing the MS in response to the first registration request message and transmitting the first registration response message to the target node; and
deleting a BCE of the serving node, upon receipt of a deregistration request message from the serving node after transmitting the first registration response message,
wherein the first registration request message includes a P bit set to indicate that the target node requests the registration of the MS by PMIP.

10. The method of claim 9, further comprising:
setting a P field in the BCE of the MS according to the P bit, and setting an A field in the BCE of the MS after transmitting the first registration response message to the target node; and
determining that the first registration request message has not been transmitted to the target node, if the P field is set and the A field is not set in the BCE of the MS.

11. The method of claim 9, further comprising transmitting to the third node a second registration request message with an error code by Mobile Internet Protocol (MIP) in response to the second registration request message.

12. The method of claim 11, wherein the registration request messages are at least one of PMIP version 4 (PMIPv4) Registration Request (RRQ) messages, MIP version 4 (MIPv4) RRQ messages, PMIP version 6 (PMIPv6) Binding Update (BU) messages, and MIPv6 BU messages, and the registration response messages are at least one of PMIPv4 Registration Response (RRP) messages, MIPv4 RRP messages, PMIPv6 Binding Acknowledge (BA) messages, and MIPv6 BA messages.

13. The method of claim 9, further comprising discarding a third registration request message without processing the third registration request message, upon receipt of the third registration request message requesting registration of the MS from the MS by client MIP before transmitting the first registration request message to the target node.

14. The method of claim 9, further comprising transmitting to the MS a third registration response message for a third registration request message, upon receipt of the third registration request message requesting registration of the MS from the MS by client MIP before transmitting the first registration request message to the target node.

15. The method of claim 14, wherein the registration request messages are at least one of PMIPv4 RRQ messages, MIPv4 RRQ messages, PMIPv6 BU messages, and MIPv6 BU messages, and the registration response messages are at least one of PMIPv4 RRP messages, MIPv4 RRP messages, PMIPv6 BA messages, and MIPv6 BA messages.

16. The method of claim 9, wherein the serving node and the target node are Packet Data Serving Nodes (PDSNs).

17. A Proxy Mobile Internet Protocol (PMIP) mobile communication system for supporting a handoff of a Mobile Station (MS), comprising:
a serving node capable of communicating with the MS;
a target node capable of communicating with the MS; and a Home Agent (HA) connected to the serving node and the target node, wherein the target node transmits a first registration request message to the HA in order to request registration of the MS, when the MS moves from a service area of the serving node to a service area of the target node, wherein the serving node discards a second registration request message without processing the second registration request message, when the serving node receives the second registration request message from the MS before the target node receives a first registration response message for the first registration request message from the HA, and wherein the serving node requests deregistration of the serving node to the HA, when the target node receives the first registration response message from the HA.

18. The PMIP mobile communication system of claim 17, wherein the first registration request message includes a P bit set to indicate that the target node requests the registration of the MS by PMIP.

19. The PMIP mobile communication system of claim 17, wherein the serving node blocks transmission of a registration request message for the MS to the HA and performs an error process, when an event triggering transmission of the registration request message for the MS to the HA occurs in the serving node before the target node receives the first registration response message from the HA.

20. The PMIP mobile communication system of claim 17, wherein the serving node transmits a second registration response message with an error code to the MS by Mobile Internet Protocol (MIP) in response to the second registration request message.

21. The PMIP mobile communication system of claim 20, wherein the registration request messages are at least one of PMIP version 4 (PMIPv4) Registration Request (RRQ) messages, MW version 4 (MIPv4) RRQ messages, PMIP version 6 (PMIPv6) Binding Update (BU) messages, and MIPv6 BU messages, and the registration response messages are at least one of PMIPv4 Registration Response (RRP) messages, MIPv4 RRP messages, PMIPv6 Binding Acknowledge (BA) messages, and MIPv6 BA messages.

22. The PMIP mobile communication system of claim 17, wherein the target node transmits to the serving node an indication message indicating reception of the first registration response message from the HA.

23. The PMIP mobile communication system of claim 17, wherein the serving node transmits a third registration request message with a lifetime set to 0 to request deletion of communication information about the MS to a serving Radio Node (RN) connected to the MS via a radio link in the service area of the serving node, when the target node receives the first registration response message from the HA.

24. The PMIP mobile communication system of claim 17, wherein the serving node and the target node are Packet Data Serving Nodes (PDSNs).

25. A Proxy Mobile Internet Protocol (PMIP) mobile communication system for supporting a handoff of a Mobile Station (MS), comprising:
  a serving node capable of communicating with the MS;
  a target node capable of communicating with the MS; and
  a Home Agent (HA) connected to the serving node and the target node,
  wherein the HA receives a first registration request message requesting registration of the MS from a target node, when the MS moves from a service area of a serving node to a service area of the target node,
  wherein the HA discards a second registration request message without processing the second registration request message, upon receipt of the second registration request message from a third node before transmitting a first registration response message for the first registration request message to the target node,
  wherein the HA generates a Binding Cache Entry (BCE) of the MS for managing the MS and transmits the first registration response message to the target node in response to the first registration request message, and
  wherein the HA deletes a BCE of the serving node, upon receipt of a deregistration request message from the serving node after transmitting the first registration response message,
  wherein the first registration request message includes a P bit set to indicate that the target node requests the registration of the MS by PMIP.

26. The PMIP mobile communication system of claim 24, wherein the HA sets a P field in the BCE of the MS according to the P bit, sets an A field in the BCE of the MS after transmitting the first registration response message to the target node, and determines that the first registration request message has not been transmitted to the target node, if the P field is set and the A field is not set in the BCE of the MS.

27. The PMIP mobile communication system of claim 25, wherein the HA transmits to the third node a second registration request message with an error code by Mobile Internet Protocol (MIP) in response to the second registration request message.

28. The PMIP mobile communication system of claim 27, wherein the registration request messages are at least one of PMIP version 4 (PMIPv4) Registration Request (RRQ) messages, MIP version 4 (MIPv4) RRQ messages, PMIP version 6 (PMIPv6) Binding Update (BU) messages, and MIPv6 BU messages, and the registration response messages are at least one of PMIPv4 Registration Response (RRP) messages, MIPv4 RRP messages, PMIPv6 Binding Acknowledge (BA) messages, and MIPv6 BA messages.

29. The PMIP mobile communication system of claim 25, wherein the HA discards a third registration request message without processing the third registration request message, upon receipt of the third registration request message requesting registration of the MS from the MS by client MIP before transmitting the first registration request message to the target node.

30. The PMIP mobile communication system of claim 25, wherein the HA transmits to the MS a third registration response message for a third registration request message, upon receipt of the third registration request message requesting registration of the MS from the MS by client MIP before transmitting the first registration request message to the target node.

31. The PMIP mobile communication system of claim 30, wherein the registration request messages are at least one of PMIPv4 RRQ messages, MIPv4 RRQ messages, PMIPv6 BU messages, and MIPv6 BU messages, and the registration response messages are at least one of PMIPv4 RRP messages, MIPv4 RRP messages, PMIPv6 BA messages, and MIPv6 BA messages.

32. The PMIP mobile communication system of claim 25, wherein the serving node and the target node are Packet Data Serving Nodes (PDSNs).

* * * * *